May 25, 1937.  A. BERSTED  2,081,164
WAFFLE MOLD
Filed April 15, 1936
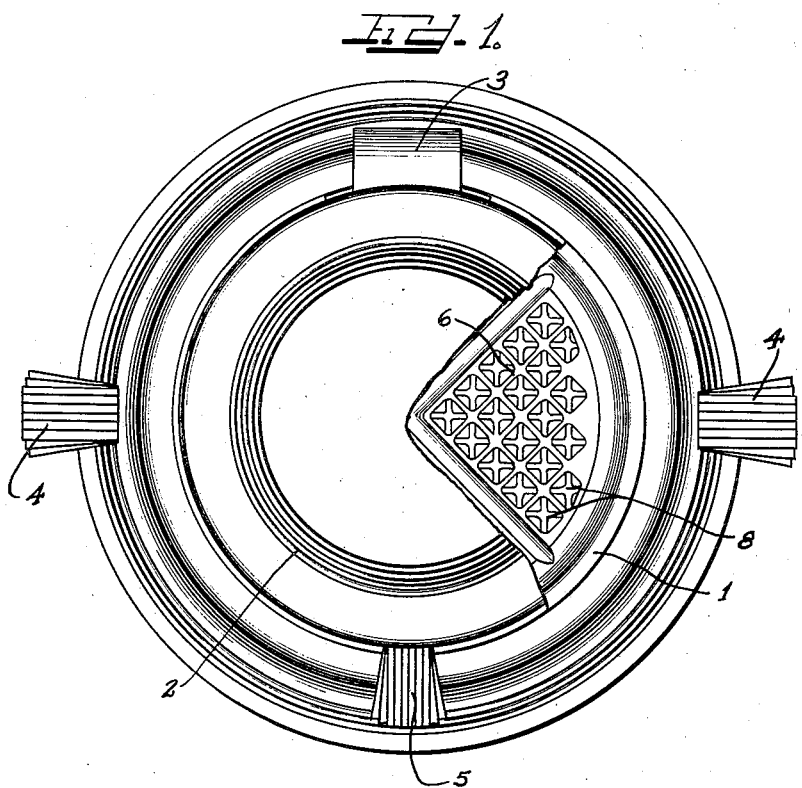
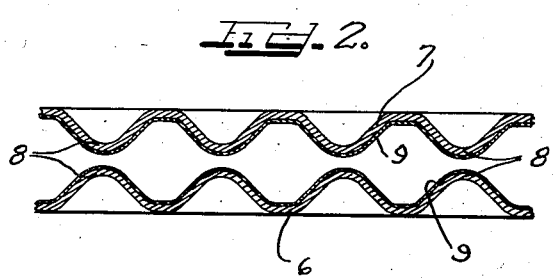
Inventor
ALFRED BERSTED.
by Charles... Attys.

Patented May 25, 1937

2,081,164

UNITED STATES PATENT OFFICE 2,081,164

WAFFLE MOLD

Alfred Bersted, Fostoria, Ohio

Application April 15, 1936, Serial No. 74,413

2 Claims. (Cl. 53—10)

This invention relates to a waffle mold, and concerns itself with a structure having its contacting or operative faces consisting of chromium plating.

In the past, it has been the general practice to make waffle molds from aluminum. Such molds could not be readily stamped and required a more costly operation in the manufacture thereof. A further and more serious objection to aluminum or like material arose from the fact that the waffles would adhere or stick thereto, and it was difficult to so thoroughly grease the aluminum surface to prevent this cohesion with the waffles.

This invention is designed to overcome the above noted objections in stamping the mold pieces from steel or the like and coating the confronting faces with chromium which has been discovered has no cohesive affinity with respect to waffles.

The invention comprises the novel structure and combination of parts hereinafter described and more particularly pointed out and defined in the appended claims.

In the accompanying drawing which illustrates a preferred form of this invention and in which similar reference numerals refer to similar features in the different views:

Figure 1 is a top plan view with a part broken away of a waffle mold involving this invention.

Figure 2 is a fragmentary sectional view of the same taken in a vertical plane.

The invention is illustrated in connection with a waffle mold comprising a lower section 1 and an upper section 2 which are preferably hinged together by a hinge member 3 as is well known in the art. The lower or base section 1 has a pair of handles 4 whereby the mold may be readily lifted and carried. The upper section has a handle 5 by means of which it may be swung upwardly on the hinge 3.

The invention concerns itself more directly with the confronting or contacting faces 6 and 7 of the two sections. These faces are formed by stamping suitable pieces of steel or metal to provide a series of knolls 8. These knolls 8 may be of any configuration. In a stamping operation they can best be formed of the particular size shown.

After the confronting face pieces 6 and 7 have been stamped to present confronting knolls, the confronting faces are coated or plated with a suitable layer of chromium 9 so that the waffle dough is confined between the two chromium plated surfaces. The manner of attaching the two face pieces 6 and 7 to their respective sections has not been illustrated since any well known method may be used.

A waffle mold constructed according to this invention possesses an important advantage over those heretofore in use in that there is no sticking cohesion between the waffle and the chromium plated surfaces. The invention also readily lends itself to a stamping operation that facilitates the operation.

I am aware that many changes may be made and numerous details of construction may be varied through a wide range without departing from the principles of this invention, and I therefore do not purpose limiting the patent granted herein otherwise than necessitated by the prior art.

I claim as my invention:

1. A waffle mold comprising a pair of hinged sections having confronting faces, said confronting faces being stamped to form knolls and depressions, and a covering of chromium plating upon each face covering said knolls and depressions to prevent cohesion with the waffle dough.

2. In a waffle mold, a pair of separable sections having confronting faces, said confronting faces having knolls and depressions, and chromium plating covering the knolls and depressions of each face to prevent cohesion with the waffle dough.

ALFRED BERSTED.